Feb. 6, 1945. S. SHERROW 2,368,890
STOCK FEED MECHANISM
Filed March 2, 1944
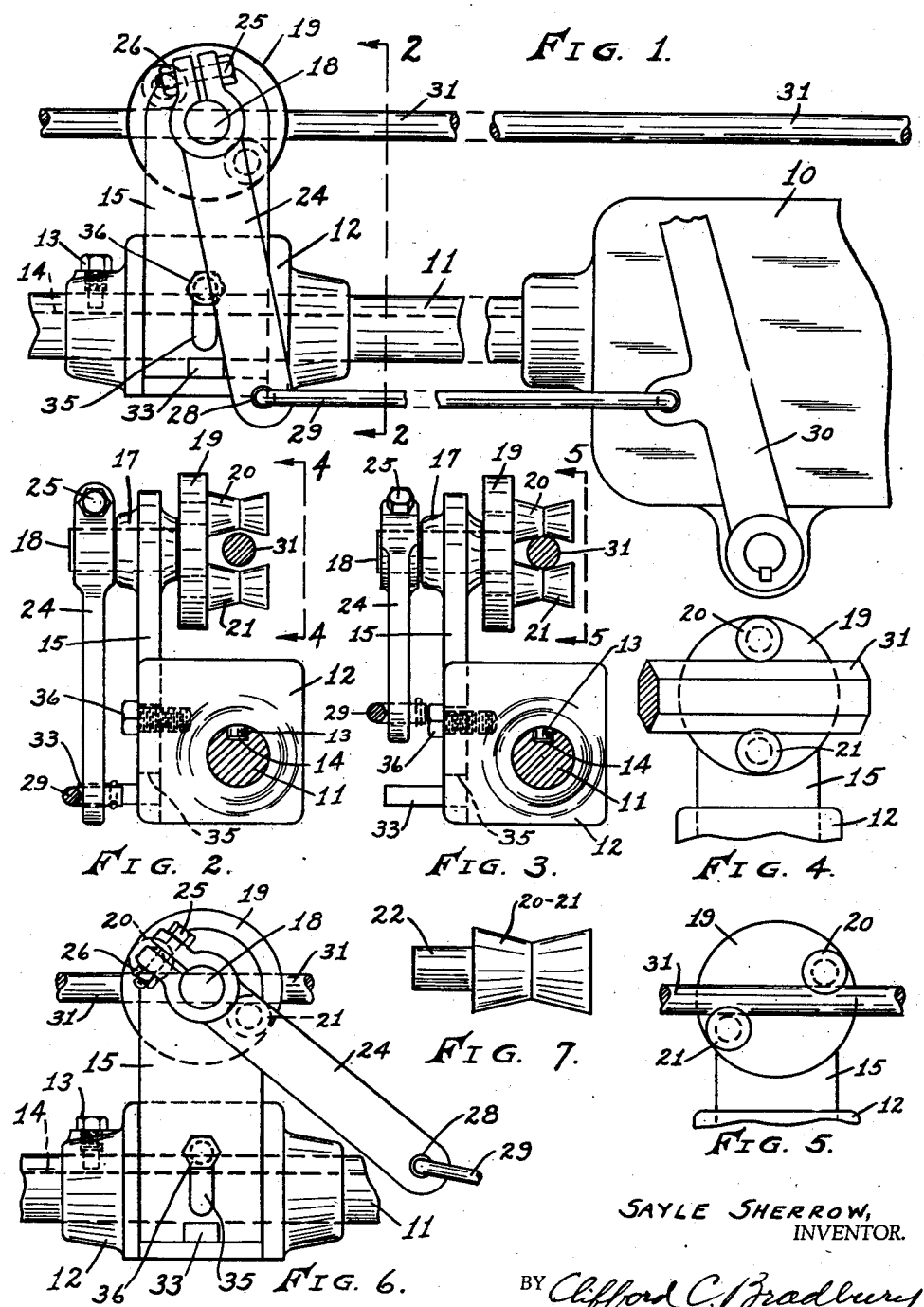
SAYLE SHERROW,
INVENTOR.
BY Clifford C. Bradbury
ATTORNEY.

Patented Feb. 6, 1945

2,368,890

UNITED STATES PATENT OFFICE 2,368,890

STOCK FEED MECHANISM

Sayle Sherrow, Richmond, Ind.

Application March 2, 1944, Serial No. 524,731

7 Claims. (Cl. 29—61)

This invention relates to stock feed mechanism for turret lathes and the like.

One object of my invention is to provide a stock feed mechanism which will engage many different sizes of bar stock without any substitution of parts, and will hold such various sizes of stock accurately on the axis of the collet or chuck through which the stock is to be fed.

Another object of my invention is to provide a stock feed mechanism which is simple in construction and inexpensive of manufacture.

Another object of my invention is to provide stock gripping members which may be readily changed to present new gripping surface on the stock when wear on such gripping members has occurred.

In carrying out my invention, I preferably make use of the cylindrical bar which is ordinarily attached to a portion of a turret lathe and which extends outwardly from the lathe head parallel with the axis of the stock and usually directly below it. Such a bar is ordinarily provided with a rack, located in a keyway, which rack is removed when the device of my invention is applied, so that the keyway may be used to prevent the rotation of my mechanism about the bar or track upon which it is slideably mounted.

My invention is illustrated in the accompanying drawing in which like parts are designated by the same numerals throughout the several views and in which, Fig. 1 is an elevation of my feed mechanism supported from a portion of the head of a turret lathe.

Fig. 2 is an elevation in the direction of the arrows 2—2 of Fig. 1 showing the gripping shoes in their freed position.

Fig. 3 is a similar elevation showing the gripping shoes in their clamping position.

Fig. 4 is a rear elevation of the clamping mechanism of Fig. 1 adjusted to accommodate larger stock than that illustrated in Fig. 1.

Fig. 5 is a rear elevation of the clamping mechanism in its engaging position on a piece of stock.

Fig. 6 is a front elevation of the feed mechanism in its clamping position on the stock, and Fig. 7 is an elevation of one of the clamping spools or shoes removed from its supporting disc.

The turret lathe to which my invention has been applied is provided with a part 10 attached to the lathe head and provided with an opening into which a bar or track 11 is fitted, which bar extends parallel to the axis of the collet or chuck of the lathe. The bar 11 is usually of considerable length because ordinarily the stock feeding mechanisms of prior devices are clamped to the stock and are moved along the bar 11 step by step through several successive stock feeds and are then again moved to a position further away from the lathe and reclamped to the stock for further step by step feeding operations. For use with my invention, the bar 11 may be much shorter than that ordinarily used since it serves merely for a support and guide on which a hub or carriage slides only the distance necessary for one feed.

A pin or key 13 extends into a keyway 14 in the bar 11 to prevent the hub 12 from rotating on its supporting bar. A plate 15 extends upwardly from one side of the hub 12 and carries at its upper end a sleeve bearing 17 rotatively supporting a shaft 18 carrying an integral disc 19. Mounted upon the side of the disc 19 is a pair of gripping spools or shoes 20 and 21, each provided with an integral cylindrical portion 22 press fitted into drilled and reamed openings in the disc 19. The end of the shaft 18 on the opposite side of the sleeve 17 from the disc 19 is provided with an arm 24 having a slotted cylindrical opening through it and provided with a bolt 25 and nut 26 for clamping the lever securely in any desired position on the shaft 18. The lower end of the arm 24 is provided with a hole 28 into which an operating link 29 extends. The other end of the link 29 is attached to a hand lever 30 pivotally carried upon the portion 10 of the turret lathe.

Upon the first movement of the hand lever 30 in a clockwise direction about its pivotal support, the collet or chuck of the lathe is opened by well known mechanism not shown to free the stock 31 for lineal movement through the collet or chuck. Further clockwise movement of the lever 30 causes the gripping members 20 and 21 to engage above and below the stock 31. After engagement has taken place, further movement of the hand lever 30 causes the carriage 12 to slide on the bar 11, and during this further movement, the gripping shoes 20 and 21 continue to engage the top and bottom of the stock 31 with a clamping action which feeds the stock through the collet or chuck of the lathe until it engages a stop usually forming a part of the turret of the lathe. The operator then moves the handle 30 in its counter-clockwise direction causing the arm 24 to rotate in its clockwise direction to free the gripping shoes 20 and 21 from their contact with the stock. The carriage 12 is provided with a lug 33 against which the arm 24 engages at the end of its clockwise rotation. After engagement has been made between the arm 24 and the lug 33, the hub 12 and parts carried thereon move bodily along the bar or track until the hand lever 30 comes to its normal operating position in which the collet or chuck is caused to again grip the stock 31 by the ordinary mechanism of the turret lathe not illustrated.

The stock 31 is usually supported at a position remote from the turret lathe so that its weight will not rest upon the gripping shoe 21 during the rotation of the stock 31. However, the gripping shoes 20 and 21 are preferably of hardened and polished steel so that even though the stock may sag upon the lower gripping member 21, it will neither harm the stock nor materially damage the gripping shoe, because even though the gripping shoe 21 eventually may be worn by contact with the rotating stock, the position on which the stock contacts the gripping shoe during the rotation of the stock is not the same angular position on the gripping shoe 21 which actually engages the stock at the time the feeding operation takes place.

Adustment for different sizes of stock is made by loosening the nut 26 and rotating the shaft 18 within the opening in the arm 24 until the gripping shoes 20 and 21 just clear the stock when the arm 24 is in contact with the lug 33. The shoes 20 and 21 are formed each at an angle of sixty degrees with the center of their contacting surfaces so that when hexagon stock is being fed the shoes will prevent line contact with flat surfaces of the stock.

Since pressure of the shoes or spools 20 and 21 against the stock depends upon the force required to slide the stock on its supports and through the lathe collet or chuck, it is obvious that the pressure of the shoes 20 and 21 will be less on light weight stock than it will be on heavy weight stock. This becomes important when the stock to be fed is in the form of thin walled tubing because, in this circumstance, the pressure required for sliding the stock will be so much less than that required for sliding heavy solid bar stock that the thin walled tubing will not be damaged by the pressure of the shoes which is sufficient for gripping the tubing. In this way my stock feeding mechanism becomes automatic in its gripping. The heavier the stock, the greater the gripping force, and the lighter the stock, the lighter the gripping force.

In order that the same feed mechanism may be used on different turret lathes in which the distance between the bars 11 and the axis of the stock differs, the plate 15 is provided with a slot 35 through which the attaching bolt 36 extends, thus permitting vertical adjustment of the plate 15 with respect to the hub 12. However, when the plate 15 is once adjusted for any one lathe, it does not need to be further adjusted for changes in the size of the stock, since the gripping spools 20 and 21 move equal distances above and below the axis of the stock when the disc 19 is rotated for different sizes of stock.

While my invention is shown and described as applied to turret lathes, it is to be understood that it is applicable to ordinary lathes, or to screw machines, or to any other type of machine in which it is important to feed the stock at intervals.

What I claim as my invention is:

1. In a device for feeding bar stock to a turret lathe, a track extending parallel to the bar to be fed, a carriage moveable along said track, a member pivotally supported on said carriage on an axis perpendicular to the axis of the stock, a pair of stock engaging spools fixed to said member and positioned on opposite sides of the stock and of the axis of said member, a means for rotating said member on its pivot to bring the stock engaging spools into and out of clamping engagement with the stock and for moving the carriage along its track to move the stock along with the movement of the carriage in its feeding direction.

2. In a device for feeding bar stock to a turret lathe, a track extending parallel to the bar to be fed, a carriage moveable along said track, a member pivotally supported on said carriage on an axis perpendicular to the axis of the stock, a pair of stock engaging spools fixed to said member and positioned on opposite sides of the stock and of the axis of said member, a means for rotating said member on its pivot to bring the stock engaging spools into and out of clamping engagement with the stock and for moving the carriage along its track to move the stock along with the movement of the carriage in its feeding direction, and a stop on the carriage, and an associated stop carried by the member to prevent the member from being rotated more than a sufficient amount to release the stock when the rotating means is moved in the direction opposite to the clamping direction.

3. In a device for feeding bar stock to a turret lathe, a track extending parallel to the bar to be fed, a carriage moveable along said track, a member pivotally supported on said carriage on an axis perpendicular to the axis of the stock, a pair of stock engaging spools fixed to said member and positioned on opposite sides of the stock and of the axis of said member, a means for rotating said member on its pivot to bring the stock engaging spools into and out of clamping engagement with the stock and for moving the carriage along its track to move the stock along with the movement of the carriage on its feeding direction and cooperating stops on the carriage and on the moving means for moving the carriage in the opposite direction when the moving means is moved in its non-feeding direction.

4. A clamping device for engagement with the bar stock to be fed to a machine comprising a member rotatable on an axis perpendicular to the axis of the stock to be fed, a pair of shoes carried by said member diagonally opposite one another with the stock extending between them, a stop to limit the rotation of said member in one direction, the contact of said shoes with the stock limiting the rotation of said member in the other direction, an operating link for rotating said member in each direction upon the first movement of said link, the further movement of said link serving to move the clamping device with the movement of said link, whereby stock is fed by movement of the link in one direction and the clamping device is moved along the stock by the movement of said link in the opposite direction.

5. In a device for feeding bar stock to a turret lathe provided with a chuck for holding the stock to rotate it for a turning operation and with a hand lever for opening and closing the chuck, a track extending parallel with the bar to be fed, a carriage moveable along said track, a member pivotally supported on said carriage on an axis perpendicular to the axis of the stock, a pair of stock engaging shoes fixed to said member and positioned diagonally opposite one another on opposite sides of the stock, an arm carried by said member for rotating said member on its pivot to bring the stock engaging shoes into and out of clamping engagement with the stock, a link extending between said arm and the clutch operating hand lever of said turret lathe for swinging said arm to bring said shoes into engagement with the stock to be fed and for then moving the carriage along its track to feed the stock through its chuck when the hand lever is moved in the direction for disengaging the chuck, the first movement of said hand lever in the opposite direction serving to rotate said member to free said shoes from the stock, further movement of said hand lever in the latter direction, serving to move the carriage along its track in a direction away from the turret lathe, the final movement of said hand lever serving to operate the chuck to engage the stock.

6. In a device for feeding bar stock to a machine, a track extending parallel with the bar to be fed, a carriage moveable along said track, a rotatable member pivoted on said carriage on an axis perpendicular to the axis of the stock, a pair of spools fixedly attached to said member and positioned on diagonally opposite sides of said stock, the axes of the spools being equal distance from and parallel with and on opposite sides of the axis of said rotatable member, the distance between said spools being greater than the diameter of the largest stock to be fed to the machine, an arm adjustably attached to the member so that the member may be rotated with respect to the arm to position the spools more nearly in a plane perpendicular to the stock when large stock is to be fed, and more remotely from a plane perpendicular to the stock when small stock is to be fed and means to rotate the arm and member in one direction to cause the spools to engage the stock, and in the other direction to cause the spools to free the stock stop, further movement of said means in either direction serving to move the carriage along the track.

7. In a device for feeding stock to a machine, a track carried by the machine and extending parallel with the stock to be fed, a carriage slideable on said track, a rotatable disc mounted on said carriage on an axis perpendicular to the stock to be fed, a pair of shoes carried rigidly upon said disc and equally spaced on opposite sides of the stock to be fed whereby the rotation of said disc on its axis in one direction causes said shoes simultaneously to engage diagonally opposite portions of the stock to be fed and whereby the rotation of said disc in the opposite direction of rotation causes the simultaneous movement of said shoes out of engagement with the stock to be fed and means to rotate said disc and to slide the said carriage on its track for feeding the stock to the machine and for rotating said disc in the opposite direction of rotation and sliding said carriage on its track in the opposite drection from the feed for disengaging the shoes from the stock and for replacing the carriage and its rotatable disc in position for the next feeding operation.

SAYLE SHERROW.